United States Patent
Shibagaki et al.

(10) Patent No.: US 7,499,678 B2
(45) Date of Patent: Mar. 3, 2009

(54) ANTENNA SHARING DEVICE AND WIRELESS COMMUNICATION TERMINAL USING THE SAME

(75) Inventors: Nobuhiko Shibagaki, Kokubunji (JP);
Mitsutaka Hikita, Hachioji (JP);
Kazuyuki Sakiyama, Chigasaki (JP);
Osamu Hikino, Yokohama (JP)

(73) Assignee: Hitachi Media Electronics Co., Ltd., Iwate-Ken (JP)

( * ) Notice: Subject to any disclaimer, the term of this patent is extended or adjusted under 35 U.S.C. 154(b) by 612 days.

(21) Appl. No.: 11/303,924

(22) Filed: Dec. 19, 2005

(65) Prior Publication Data

US 2006/0141944 A1 Jun. 29, 2006

(30) Foreign Application Priority Data

Dec. 27, 2004 (JP) ............................. 2004-377250

(51) Int. Cl.
*H04B 1/46* (2006.01)

(52) U.S. Cl. .................. 455/82; 455/129; 455/67.11; 455/78; 370/342; 333/134

(58) Field of Classification Search .............. 455/67.11, 455/129, 276.1; 370/342; 333/134
See application file for complete search history.

(56) References Cited

U.S. PATENT DOCUMENTS

| | | | | |
|---|---|---|---|---|
| 6,928,276 | B2 * | 8/2005 | Kushihi | 455/276.1 |
| 7,142,832 | B2 * | 11/2006 | Inoue et al. | 455/129 |
| 7,196,595 | B2 * | 3/2007 | Tsai et al. | 333/134 |
| 2003/0125001 | A1 * | 7/2003 | Kushihi | 455/276.1 |
| 2004/0087286 | A1 | 5/2004 | Inoue et al. | |
| 2004/0240420 | A1 * | 12/2004 | Nakai | 370/342 |

FOREIGN PATENT DOCUMENTS

| | | |
|---|---|---|
| JP | 2001-127663 | 10/1999 |
| JP | 2001-186047 | 12/1999 |
| JP | 2002-208873 | 1/2001 |
| JP | 2002-246942 | 2/2001 |
| JP | 2003-8470 | 6/2001 |
| JP | 2003-092539 | 9/2001 |
| JP | 2003-347962 | 5/2002 |
| JP | 2004-040322 | 7/2002 |
| JP | 2003-133989 | 8/2002 |
| JP | 2004-72586 | 8/2002 |
| JP | 2004-193858 | 12/2002 |
| JP | 2004-193866 | 12/2002 |
| JP | 2004-235877 | 1/2003 |
| JP | 2004-032673 | 2/2003 |
| JP | 2004-32674 | 2/2003 |
| JP | 2004-032674 | 2/2003 |
| JP | 2004-297455 | 3/2003 |
| JP | 2004-297633 | 3/2003 |
| JP | 2004-320244 | 4/2003 |

* cited by examiner

*Primary Examiner*—Matthew D Anderson
*Assistant Examiner*—April S Guzman
(74) *Attorney, Agent, or Firm*—Reed Smith LLP; Juan Carlos A. Marquez, Esq.

(57) ABSTRACT

A compact, inexpensive antenna sharing device meeting requirements in terms of transmitter distortion characteristic and ESD characteristic is provided which separates and combines signals transmitted and received in first to third signal bands and which thereby enables an antenna terminal to be shared as a common terminal. It includes a diplexer realizing an attenuation characteristic for protection against ESD, a compound semiconductor switch with an IIP3 of 66 dBm or more, and an inexpensive PIN diode switch.

19 Claims, 9 Drawing Sheets

FREQUENCY ALLOCATION OF MOBILE PHONE SYSTEMS

| SYSTEM | TRANSMIT FREQUENCY | RECEIVE FREQUENCY |
|---|---|---|
| EGSM | 880-915MHz | 925-960MHz |
| (GSM) | 880-905MHz | 935-960MHz |
| GSM850 | 824-849MHz | 869-894MHz |
| DCS | 1710-1785MHz | 1805-1880MHz |
| PCS | 1850-1910MHz | 1930-1990MHz |
| WCDMA | 1920-1980MHz | 2110-2170MHz |

FIG. 12

ANTENNA SHARING DEVICE AND WIRELESS COMMUNICATION TERMINAL USING THE SAME

CLAIM OF PRIORITY

The present application claims priority from Japanese application JP 2004-377250 filed on Dec. 27, 2004, the content of which is hereby incorporated by reference into this application.

FIELD OF THE INVENTION

The present invention relates to an antenna sharing device which, in a communication device such as a mobile phone, separates and combines transmit and receive signals, and thereby enables an antenna terminal to be put in shared use.

BACKGROUND OF THE INVENTION

An antenna sharing device for use with a dual-mode mobile phone compatible with GSM and W-CDMA systems has been known in which: a diplexer separates a frequency band for GSM and a frequency band for W-CDMA; transmit and receive signals in the GSM band are separated using a high-frequency switch for GSM; and transmit and receive signals in the W-CDMA band are separated using a duplexer for W-CDMA (see, for example, U.S. patent application Publication No. 2004/0240420 A1).

Another antenna sharing device has been known in which, in order to use frequency bands for GSM, DCS, PCS, and W-CDMA: a diplexer separates a low-frequency band in which GSM transmit and receive signals are included and a high-frequency band in which DCS, PCS and W-CDMA transmit and receive signals are included; the GSM transmit and receive signals are separated using a first high-frequency switch; and the DCS and PCS transmit signals, the DCS and PCS receive signals, and the W-CDMA transmit signal are separated using a second high-frequency switch (see, for example, Japanese Patent Laid-Open No. 2004-40322). There has also been a wireless telephone terminal having a high-frequency signal processing circuit in which, in order to use frequency bands for EGSM, GSM850, GSM, DCS, and PCS: switching elements included in a switching circuit on the high-frequency side for handling high-frequency signals separated, by a diplexer, from low-frequency signals are made of high-frequency compound semiconductor transistors and switching elements included in a switching circuit on the low-frequency side for handling low-frequency signals separated, by the diplexer, from the high-frequency signals are made of PIN diodes (see, for example, Japanese Patent Laid-Open No. 2004-193866). There has also been a high-frequency device in which a varistor and an inductor are connected in parallel with a signal line between an antenna terminal and a diplexer (see, for example, U.S. Patent Application Publication No. 2004/0087286 A1).

SUMMARY OF THE INVENTION

In recent years, it has been becoming essential that mobile phones have functional units not only for phoning but also for high-speed data communications. Hence, in many countries, various multiplex systems which enable high-speed data communications are being considered for adoption. Unifying such various multiplex systems, however, appears difficult. Under the circumstances, therefore, mobile phones are needed to have multi-mode (i.e., multiple systems such as time-division systems and code-division systems) and multi-band (i.e., multiple frequency bands) capability.

For example, dual-band mobile phones compatible with the GSM (Global System for Mobile Communications) system and the DCS (Digital Cellular System) system are widely used in all parts of Europe. The GSM and DCS systems are time division multiple access systems. In Europe, third-generation mobile phones such as dual-mode, triple-band mobile phones, dual-mode, quad-band mobile phones, and dual-mode, quintet-band mobile phones are also being developed. The dual-mode, triple-band mobile phones are compatible with, in addition to the above two systems, the wideband code division multiple access (W-CDMA) system that can realize a high data transmission rate (for example, 2 Mbps). The dual-mode, quad-band mobile phones are additionally compatible with the PCS (Personal Communication System). The dual-mode, quintet-band mobile phones are still additionally compatible with the GSM850 system, that is, a time division multiple access system which, while being compatible with the GSM, DCS, and PCS+WCDMA systems, allows use of the 800 MHz band used in the United States.

Adding new functional units to a mobile phone makes its circuit more complicated and increases the number of its components. In the field of mobile phones, therefore, technology for higher-density component mounting is in demand. Under such circumstances, it is essential, in terms of internal high-frequency circuits of mobile phones, to make components smaller, lighter and composite and to promote component integration so as to make space required for component mounting smaller.

The antenna sharing devices disclosed in U.S. Pat. No. 2004/0240420 A1 and Japanese Patent Laid-Open No. 2004-40322, however, incorporate no technical ingenuity in connection with the transmitter distortion specified for the WCDMA system. With such antenna sharing devices, it will not be possible to achieve radio specifications which can meet the WCDMA standard. Furthermore, known conventional technology provides no measure to cope with an instantaneous high voltage (ESD: ElectroStatic Discharge) to which an antenna sharing devices may be subjected, for example, when lightning occurs. Thus, there has been a problem that radio reliability under practical operating conditions cannot be guaranteed.

The wireless telephone terminal disclosed in Japanese Patent Laid-Open No. 2004-193866 also incorporates no consideration with regard to the transmitter distortion specified for the WCDMA system or with regard to ESD.

For a communication device such as a mobile phone, there is a risk of its internal switching circuit being destroyed by high-voltage static electricity coming in via an antenna terminal. Conventionally, according to U.S. Pat. No. 2004/0087286 A1, a high-pass filter including a capacitor and an inductor is connected between the antenna terminal and the internal switching terminal so as to protect the switching circuit. To increase the attenuation outside the pass band of the high-pass filter, however, it becomes necessary to connect capacitors and inductors in multiple stages. Making such multistage connections, however, not only increases insertion loss but also makes the high-frequency device larger. The measure against such static electricity proposed in U.S. Pat. No. 2004/0087286 A1 is a configuration in which a varistor and an inductor are connected in parallel with a signal line between an antenna terminal and a diplexer. According to U.S. Pat. No. 2004/0087286 A1, the configuration makes high-voltage noise such as static electricity bypass to a ground terminal by means of the inductor without increasing the insertion loss in the pass band. At the same time, according to U.S. Pat. No. 2004/0087286 A1, an initially generated high-frequency component left unremoved by the inductor is absorbed by the varistor, so that circuits downstream of the diplexer are not subjected to a high voltage and so that it is possible to transmit required signals only. However, the varistor used to cope with ESD in the configuration disclosed in U.S. Pat. No. 2004/0087286 A1 is an external device. This makes it impossible to integrate all components of an antenna sharing device, so that it is difficult to make the antenna sharing device smaller and more inexpensive.

The present invention has been made in view of the above circumstances and one of objects of present invention is to provide an antenna sharing device which can process transmit and receive signals in at least three frequency bands, which can meet a distortion characteristic requirement for a receiving system using a code division multiple access system, which can be easily made smaller, lighter and composite, and components of which can be integrated with ease.

Another object of the present invention is to provide a high-performance antenna sharing device which can separate and combine transmit and receive signals in at least three frequency bands, which meets requirements in terms of transmitter distortion characteristic and ESD resistivity, and which can be made smaller and more inexpensive.

According to an aspect of the present invention, an antenna sharing device includes a diplexer and can switch paths for signals in plural frequency bands, wherein said diplexer comprising: at least a common signal terminal which is connected to an antenna and which transmits and receives signals in said plurality of frequency bands; a high-pass filter; and units for distributively outputting signals in each frequency band selected from said receive signals and for combining and outputting transmit signals to said signal terminal;

wherein said antenna sharing device further comprising: a first high-frequency switch which is connected to said high-pass filter and which separates the transmit and receive signals in said plurality of frequency bands; and a second high-frequency switch which is connected to a first output terminal of said first high-frequency switch and which separates said transmit signal and the receive signal in a frequency band separated from said plurality of frequency bands;

wherein said first high-frequency switch includes compound semiconductors and said second high-frequency switch connected to said first output terminal includes PIN diodes.

According to the present invention, a compact, inexpensive antenna sharing device is provided.

DETAILED DESCRIPTION OF THE PREFERRED EMBODIMENTS

The present invention relates to an antenna sharing device which separates and combines signals transmitted and received in plural frequency bands and thereby enables an antenna terminal to be put in shared use. The antenna sharing device according to the present invention includes a diplexer which separates signals transmitted and received in plural frequency bands. The diplexer separates, for example, signals in a first signal band and signals in second and third signal bands with systems such as TDMA (Time Division Multiple Access) and CDMA (Code Division Multiple Access) being used in such frequency bands. The signals in the second and third signal bands separated from the signals in the first signal band are then separated as follows. The transmit and receive signals in the second signal band in which TDMA is used and the transmit and receive signals in the third signal band in which CDMA is used are separated using compound semiconductor switches having a superior distortion characteristic. The transmit signal and the receive signal in the second signal band are separated from each other using PIN diode switches which contribute to a cost reduction. The input IP3 (Third-Order Input Intercept Point) of the compound semiconductors to be used is required to be 66 dBm or more in order to meet the distortion specification for a reception system using a WCDMA system.

Furthermore, using a configuration in which the input-output characteristic between first and third terminals of the diplexer is such that an attenuation is 30 dB or more in a frequency range from DC to 200 MHz makes it possible to meet a requirement for ESD (ElectroStatic Discharge) characteristic. When such a configuration is used, it is unnecessary to use an external device for coping with ESD, so that the antenna sharing device can be made smaller and more inexpensive.

The above configuration makes it possible to separate signals in at least three signal bands, meet the distortion specification for a receiver required to be met according to the WCDMA specification, and provide the antenna sharing device, internally, with a measure required with respect to an ESD characteristic.

In the following, example antenna sharing devices according to embodiments of the present invention and an example wireless communication terminal using one of the antenna sharing devices will be described in detail with reference to the accompanying drawings.

Embodiment 1

Figure 1:
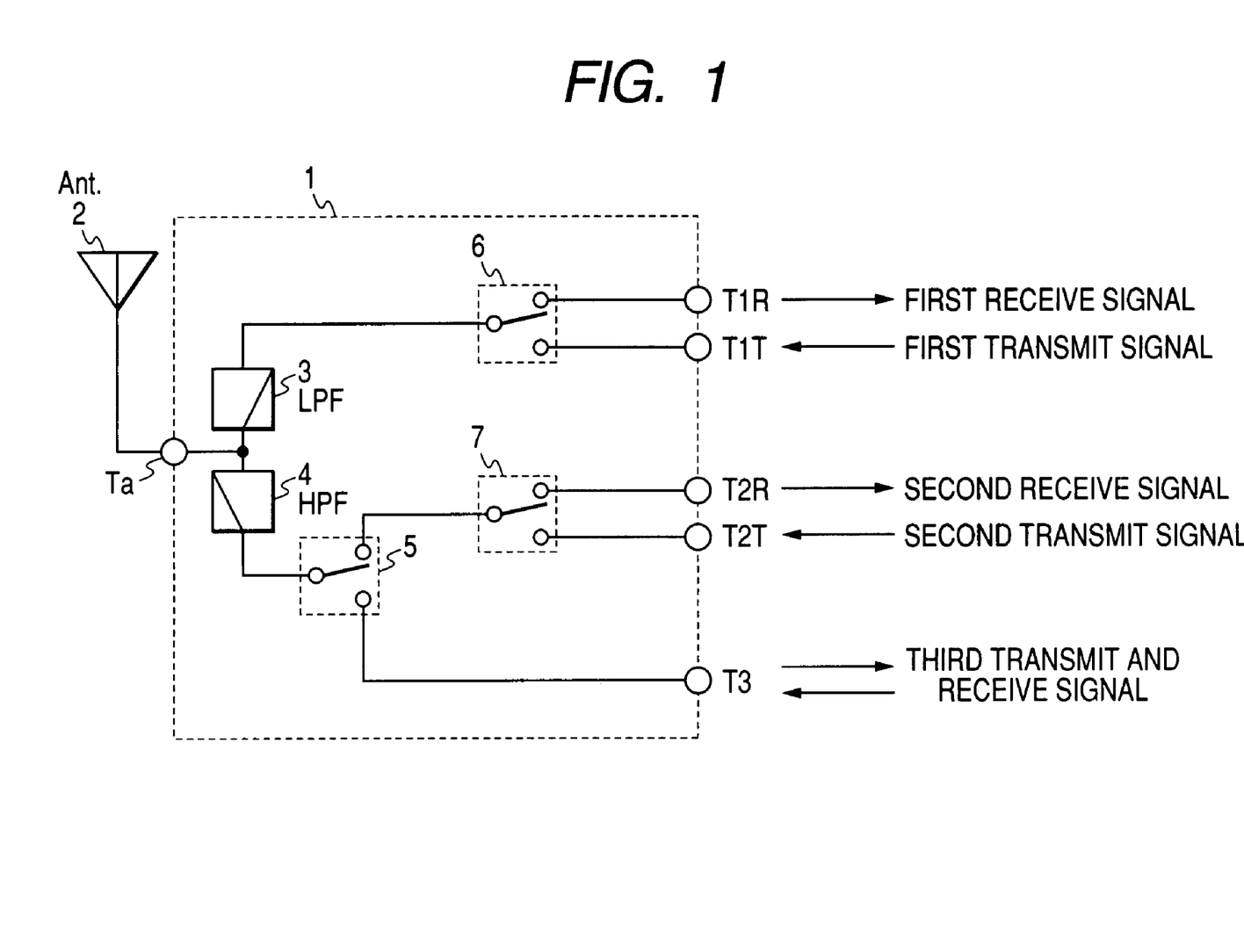
FIG. 1 is a block diagram showing an antenna sharing device according to a first embodiment of the present invention.

First, a most basic configuration of an antenna sharing device as shown in FIG. 1 will be described as a first embodiment of the present invention. Referring to FIG. 1, it is considered important to use appropriate combinations of signal bands, indicated as the first, second and third transmit and receive signals in FIG. 1, and communication systems; for example, combinations of the first signal band and a GSM (Global System for Mobile Communications) system, the second signal band and a DCS (Digital Cellular System) system, and the third signal band and a WCDMA (Wideband Code Division Multiple Access) system.

The present embodiment will be described based on the above three combinations. The transmit signal frequency band and receive signal frequency band used by the GSM system are from 880 MHz to 915 MHz and from 925 MHz to 960 MHz, respectively. The transmit signal frequency band and receive signal frequency band used by the DCS system are from 1710 MHz to 1785 MHz and from 1805 MHz to 1880 MHz, respectively. The transmit signal frequency band and receive signal frequency band used by the WCDMA system are from 1920 MHz to 1990 MHz and from 2110 MHz to 2180 MHz, respectively. The maximum frequency of the first frequency band is lower than the minimum frequency of the second and third frequency bands.

As shown in FIG. 1, an antenna sharing device 1 having a terminal Ta to which an antenna 2 is connected includes a diplexer having a low-pass filter (LPF) 3 and a high-pass filter (HPF) 4. The diplexer has a unit for letting only GSM signals inputted from the antenna 2 pass to the LPF 3 while making DCS and WCDMA signals inputted from the antenna 2 pass to the HPF 4.

Figure 2:
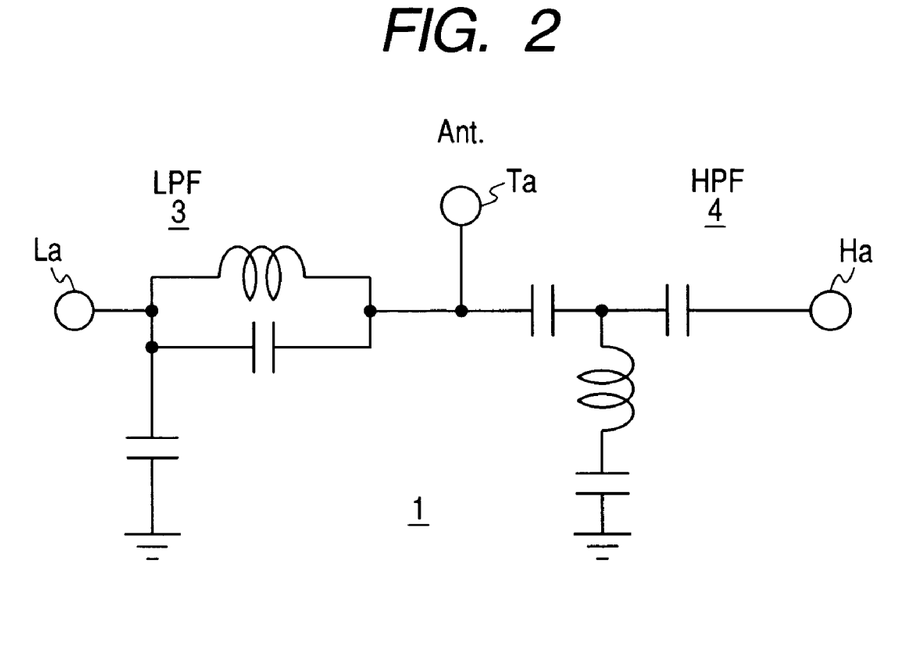
FIG. 2 is a circuit diagram showing an example circuit configuration of the diplexer shown in FIG. 1.

FIG. 2 shows a concrete example of diplexer circuit of the antenna sharing device 1. As shown in FIG. 2, each of the low-pass filter (LPF) 3 and the high-pass filter (HPF) 4 included in the diplexer may have plural inductances and capacitances. Many of the circuit elements included in the diplexer are formed between layers of a ceramic substrate.

Figure 7:
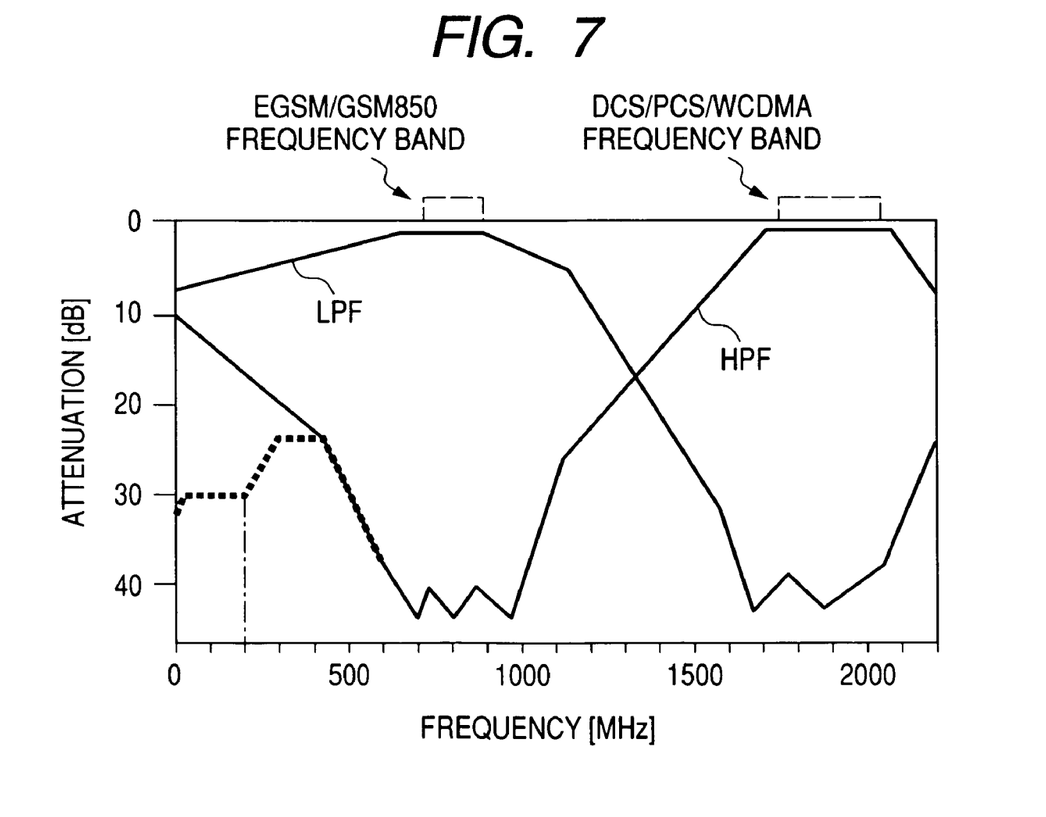
FIG. 7 is a diagram showing an example characteristic (relationship between frequency and attenuation) of each of a pair of low-pass filter (LPF) and high-pass filter (HPF) included in the diplexer according to the present embodiment.

FIG. 7 shows an example characteristic (relationship between frequency and attenuation) of each of the low-pass filter (LPF) 3 and the high-pass filter (HPF) 4 included in the diplexer according to the present invention. As shown in solid line, the low-pass filter (LPF) 3 covers the frequency bands of the GSM and GSM850, and the high-pass filter (HPF) 4 covers the frequency bands of the DCS, PCS and WCDMA.

Reverting to FIGS. 1 and 2, a high-frequency switch 6 is connected to an output terminal La on the LPF 3 side of the diplexer, and a high-frequency switch 5 including compound semiconductors is connected to an output terminal Ha on the HPF 4 side of the diplexer. An output terminal of the high-frequency switch 5 is connected to a terminal T3 for inputting and outputting the WCDMA signals. The other output terminal of the high-frequency switch 5 is connected to a high-frequency switch 7 including PIN diode switches.

The high-frequency switch 5 has a unit for separating the DCS transmit and receive signals and the WCDMA transmit and receive signals. The DCS transmit and receive signals separated from the WCDMA transmit and receive signals by the high-frequency switch 5 are then separated into the WCDMA transmit signal and the WCDMA receive signal at the high-frequency switch 7. The GSM transmit and receive signals separated from other signals at the diplexer are separated into the GSM transmit signal and the GSM receive signal at the high-frequency switch 6. The GSM transmit signal and the GSM receive signal separated at the high-frequency switch 6 are connected to terminals T1T and T1R, respectively. The DCS transmit signal and the DCS receive signal separated at the high-frequency switch 7 are connected to terminals T2T and T2R, respectively.

Figure 3:
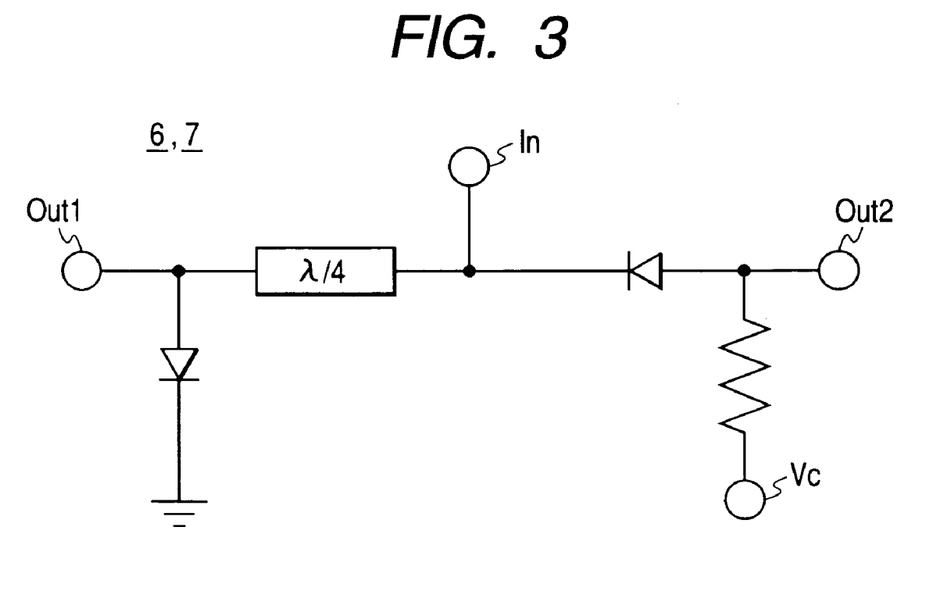
FIG. 3 is a circuit diagram showing an example circuit configuration of a high-frequency switch (using PIN diodes) shown in FIG. 1.
Figure 4:
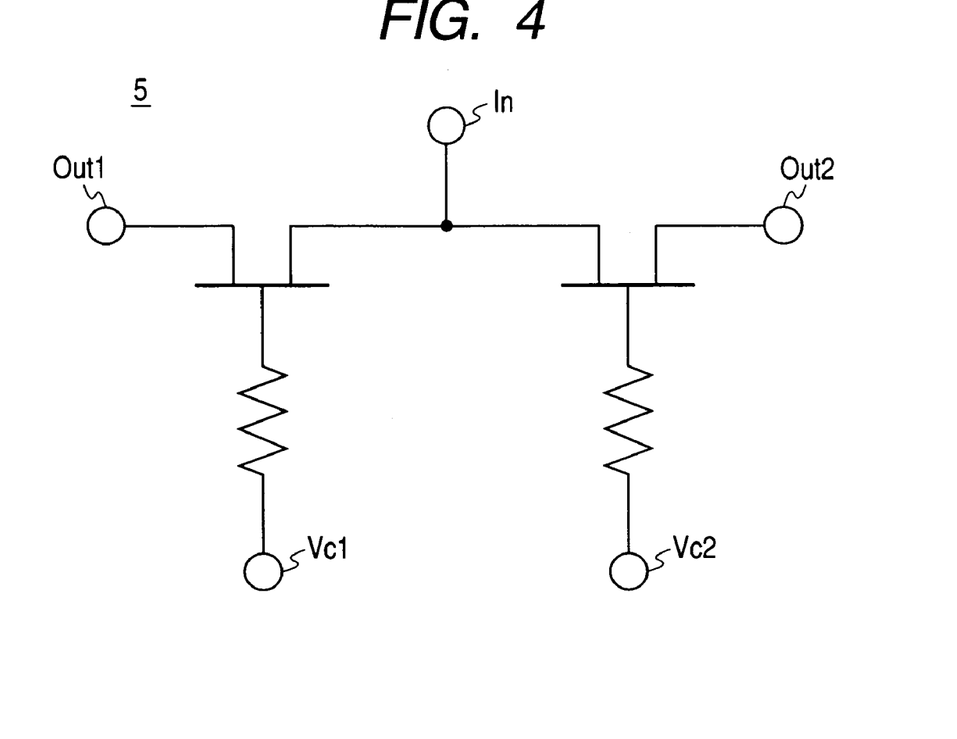
FIG. 4 is a circuit diagram showing an example circuit configuration of a high-frequency switch (using compound semiconductors) shown in FIG. 1.

FIGS. 3 and 4 show concrete examples of high-frequency switches. Shown in FIG. 3 is a configuration of the high-frequency switches 6 and 7, that is, a so-called SPDT (Single Pole Dual Throw) switch configuration in which PIN diodes are used and which includes one input (In) and two outputs (Out 1 and Out 2). As shown in FIG. 3, a high-frequency switch can be composed using two diodes, a ¼-wavelength distributed constant line, and a bias terminal Vc.

FIG. 4 shows an example configuration of the high-frequency switch 5, that is, a SPDT switch using compound semiconductors. The high-frequency switch 5 includes two transistor structures and two bias circuits Vc1 and Vc2.

The two types of high-frequency switches, that is, the high-frequency switches 6 and 7 and the high-frequency switch 5 differ in configuration, but they are equivalent to each other in basic function, that is, separating one input signal into two output signals by bias control.

As is clear from FIGS. 3 and 4, in the switch including PIN diodes, SPDT operation is realized using bias control at a location, but, in the switch including compound semiconductors, it is necessary to use bias control at two locations to realize SPDT operation. Namely, in terms of circuit simplicity, the PIN diode is superior to the compound semiconductor. In terms of price, too, a switch using PIN diodes made of inexpensive Si can be produced, in many cases, at lower cost than a switch using a relatively expensive semiconductor such as GaAs.

There is however a fundamental problem with a switch using PIN diodes. That is, a nonlinear component generated when a large-amplitude signal is inputted to an unbiased diode deteriorates the distortion characteristic of the switch as a whole. For this reason, PIN diode switches cannot be used in a WCDMA system which uses code division and whose requirement for a distortion characteristic is strict, even though they can be used in a GSM system which uses time division and whose requirement for the distortion characteristic is not so strict as in the case of a WCDMA system.

Figure 5:
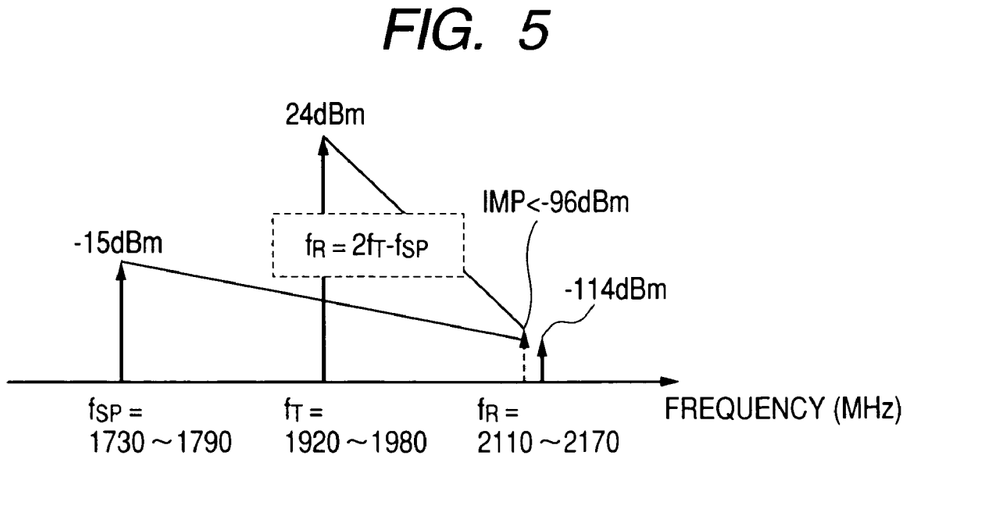
FIG. 5 is a diagram for explaining generation of a false receive signal attributable to distortion characteristics of a disturbing signal and a transmit signal.

In the present embodiment, therefore, compound semiconductor switches are used only in circuit paths for WCDMA signals requiring a strict distortion specification to be met. A further explanation in this respect follows. First, the distortion characteristic required of a WCDMA reception system will be explained with reference to FIG. 5. FIG. 5 shows generation of a false signal attributable to a third-order intermodulation distortion between a spurious frequency (=transmission frequency $f_T$–190 MHz) and the transmit signal ($f_T$). Such a false signal is generated because, with the spurious signal frequency $f_{sp}$ being equal to the transmit signal frequency $f_T$ less 190 MHz (that is, $f_{sp}=f_T-190$ MHz), a relationship expressed by an equation '$f_R=2f_T-f_{sp}$' where $f_R$ is the receive signal frequency is established.

The maximum allowable signal power at a spurious frequency is –15 dB according to the WCDMA specification. The powers of the transmit signal and the receive signal are specified to be 24 dBm and –114 dBm, respectively. According to the standard, the power of a false receive signal generated by a third-order intermodulation between a spurious signal and a transmit signal must be –96 dBm or less.

In the following, the reason why the power of the false receive signal must be –96 dBm or less and why, in that case, the IIP3 (Third-Order Input Intercept Point) of the switch is required to be 66 dBm or more will be explained.

According to the WCDMA standard, the reception power is: DPCH_Ec=−114 dBm/3.84 MHz.

Eb/No which satisfies 'BER=$10^{-3}$' is, when turbo coding and decoding is used, 1.4 dB (that is, Eb/No=1.4 dB). When a degradation of about 1 dB at a modem is taken into account: Eb/No=2.4 dB.

Thermal noise is: 10 log (kTB)=−174 dBm+10 log (3.84 MHz) =(−174+65.8433) dBm=108.1567 dBm. The processing gain (PG) is: PG=10 log (3.84 NHz/30 kHz)=21.0721 dB.

When the allowable third-order intermodulation distortion power is represented by PIMD3 (acceptable), 'PIMD3 (acceptable)+Eb/No' equals the sum of reception power and processing gain. Hence, the following equation can be established.

$$PIMD3\ (acceptable)+Eb/No=DPCH\_Ec+PG$$

When values obtained from the specification are substituted into the equation, 'PIMD3 (acceptable)=−95.3279 dBm' is obtained.

Since the third-order intermodulation distortion power that actually occurs, i.e. PIMD3 (actual), is overlapped with noise and interference from other codes, the equivalent noise is expressed as 'PIMD3 (actual)+(NF (total)+10 log (kTB))+(I^ or −DPCH_Ec)'.

Since the PIMD3 (acceptable) is greater than the above equivalent noise, the following relationship is required to be established.

$$PIMD3\ (acceptable) \geqq PIMD3\ (actual)+(NF(total)+10 \log (kTB))+(I\ or\ -DPCH\_Ec)$$

By substituting values into the above expression, the following expression is obtained.

$$PIMD3\ (actual) \leqq -98.7571\ dBm$$

(Extraction of NF (Total) is not shown above, but the value of NF (Total) can also be obtained by calculation similar to the above shown.)

Based on the definition of IIP3, the following equation is established among PIMD3 (actual), transmission power Pt, spurious power Pf, IIP3, and loss in the receiving system L:

$$PIMD3\ (actual)=2 \times Pt+1 \times Pf-2IIP3-L$$

When the transmission power Pt is assigned a value of 25 dBm, that is, 0.25 W (24 dBm)+1 dB (an addition as a margin), and the loss in the receiving system is assigned a value of 1.5 dB, the IIP3 can be expressed as follows.

$$PIMD3\ (actual)=2\times(25\ dBm)+(-15\ dBm)-2\times IIP3-1.5\ dB \leqq -98.7571\ dBm$$

Therefore, $$IIP3 \geqq 66.129\ dBm$$

In extracting the above expression of the IIP3, approximate values were assigned to some uncertain elements. For practical purposes, therefore, adopting an expression 'IIP3≧66 dBm' causes no problem.

The IIP3 of 66 dBm or more corresponds to a minimum distortion specification to be met by the switch in configuring a receiver complying with the WCDMA specification.

In the configuration of the present embodiment, an acceptable distortion characteristic is achieved by using compound semiconductor switches with an IIP3 of 66 dBm or more only for circuit paths for WCDMA signals. For other circuit paths not requiring a strict distortion characteristic, PIN diode switches are used for a cost reduction.

Next, technical arrangements made with respect to an ESD characteristic will be described in detail. An antenna sharing device has a problem that, when its antenna is subjected to a high inrush voltage attributable to, for example, lightning, semiconductor devices making up switches are easily destroyed. Compound semiconductors, in particular, are generally vulnerable to ESD. Conventionally, therefore, it was common to include, for protection against ESD, a varistor in a circuit as described in U.S. Pat. No. 2004/0087286 A1.

Namely, using an "external varistor" as described in U.S. Pat. No. 2004/0087286 A1 was conventionally a common measure for protection against ESD. It used to be considered necessary to completely block a surge using a varistor. The inventor of the present invention found that it is not necessarily necessary to completely block a surge and that it is good enough to attenuate the surge to an extent where a device such as a compound semiconductor is not destroyed. A brief explanation in this connection will follow.

Figure 6:
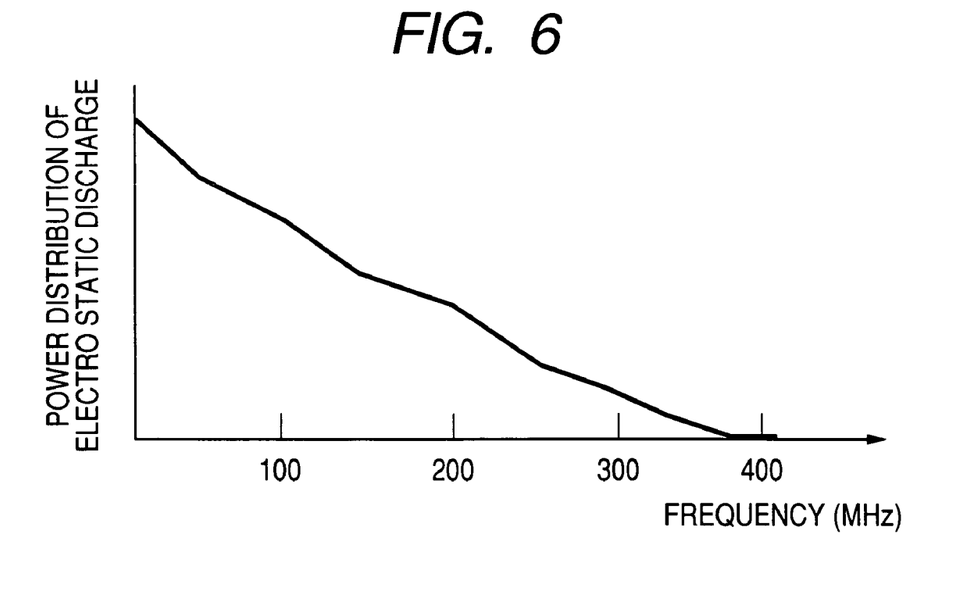
FIG. 6 is a diagram showing frequency components of a signal generated by ESD.

FIG. 6 shows a frequency characteristic of an inrush power signal. What is to be taken into consideration in terms of ESD is basically a DC component of the signal, but the signal actually includes, as shown, a frequency distribution up to about 400 MHz. The frequency distribution is accounted for mostly by frequencies up to 200 MHz. With this taken into account, in the configuration of the antenna sharing device of the present invention, the high-pass filter side of the diplexer is provided with an attenuation characteristic of 30 dB or more over a frequency band of DC to 200 MHz so as to prevent a main part of the inrush power from reaching the switching circuit.

Now, on the assumption (1) the threshold voltage to trigger an electric static discharge is 6000 V and (2) the withstand voltage of a compound semiconductor is 200 V, an attenuation required for the compound semiconductor will be studied in the following.

ESD power is centered in a frequency band of up to 200 MHz according to actual measurement data. It is therefore appropriate to use a high-pass filter with an attenuation of 30 dB at 0 to 200 MHz. With an attenuation characteristic of 30 dB or so provided, even if a surge voltage of 6000V is inputted, the output of the high-pass filter (HPF) 4 (that is the input to a compound semiconductor) is attenuated to slightly below 200 V.

How this occurs will be explained in the following. The ESD power distributed as described above is most extensive in the DC region. An estimation made for the DC region will be shown below.

Where the attenuation of HPF is 30 dB, the ESD voltage before passing the HPF is V2, and the ESD voltage after passing the HPF is V1, the following equation can be established.

$$-30dB=20 \times \log 10(V1/V2)$$

From the above equation, the ratio of the ESD voltage before passing the HPF to the ESD voltage after passing the HPF is calculated as follows.

$$V1/V2=10^{-3/20}=0.0316$$

Hence, when V2 is 6 kV, V1 is 189.6V. Thus, when an attenuation of 30 dB is provided, the output voltage of the HPF can be held within the withstand voltage 200 V of the compound semiconductor (pHEMT).

As described above, a surge need not necessarily be blocked completely to cope with ESD. It is good enough to attenuate the surge to an extent where a device such as a compound semiconductor is not destroyed. From the above point of view, it is desirable to set the characteristic of a high-pass filter such that the filter has a large attenuation in a low-frequency region as shown in broken line in FIG. 7.

A high-pass filter having such an attenuation characteristic can be realized using a configuration which includes plural inductances L and capacitances C as internal circuits.

Figure 8:
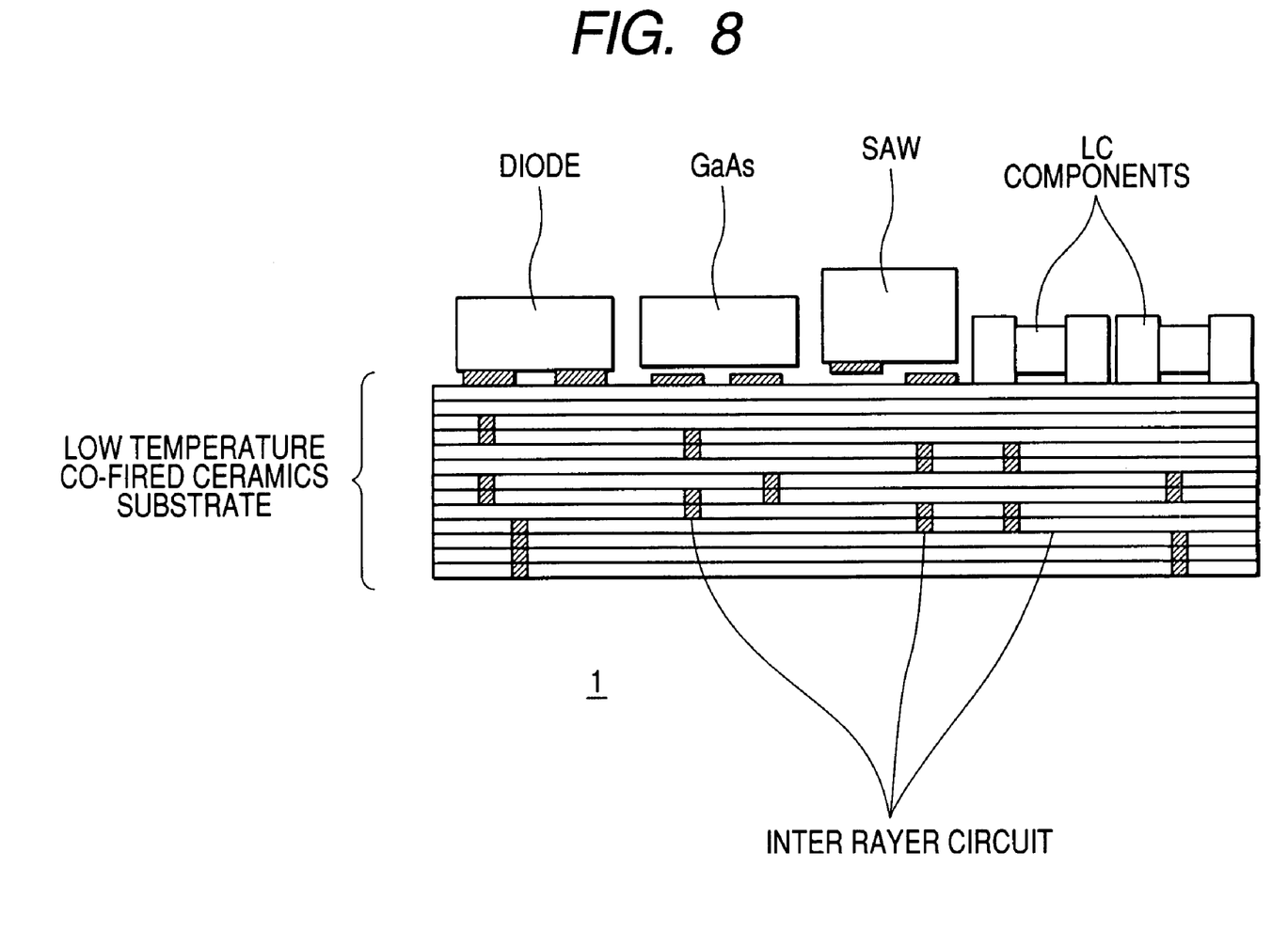
FIG. 8 is a diagram showing a longitudinal sectional view of the antenna sharing device according to the first embodiment of the present invention.

FIG. 8 shows a longitudinal sectional view of the antenna sharing device 1 according to the present embodiment. A ceramic substrate made of low temperature co-fired ceramics (LTCC) is used. PIN diodes, compound semiconductor switches made of GaAs, and SAWs included in the antenna sharing device are mounted on the ceramic substrate. Some of the LC components of the low-pass filter (LPF) 3 and the high-pass filter (HPF) 4 are also mounted on the ceramic substrate. Other inductances L and capacitances C which are included in the low-pass filter (LPF) 3 and the high-pass filter (HPF) 4 are formed as internal circuits between internal layers of the ceramic substrate.

According to the present embodiment, using the configuration as described above makes it possible to create a compact antenna sharing device while coping with ESD. Namely, an antenna sharing device can be made smaller by not using a varistor as a means to cope with ESD.

Embodiment 2

Figure 9:
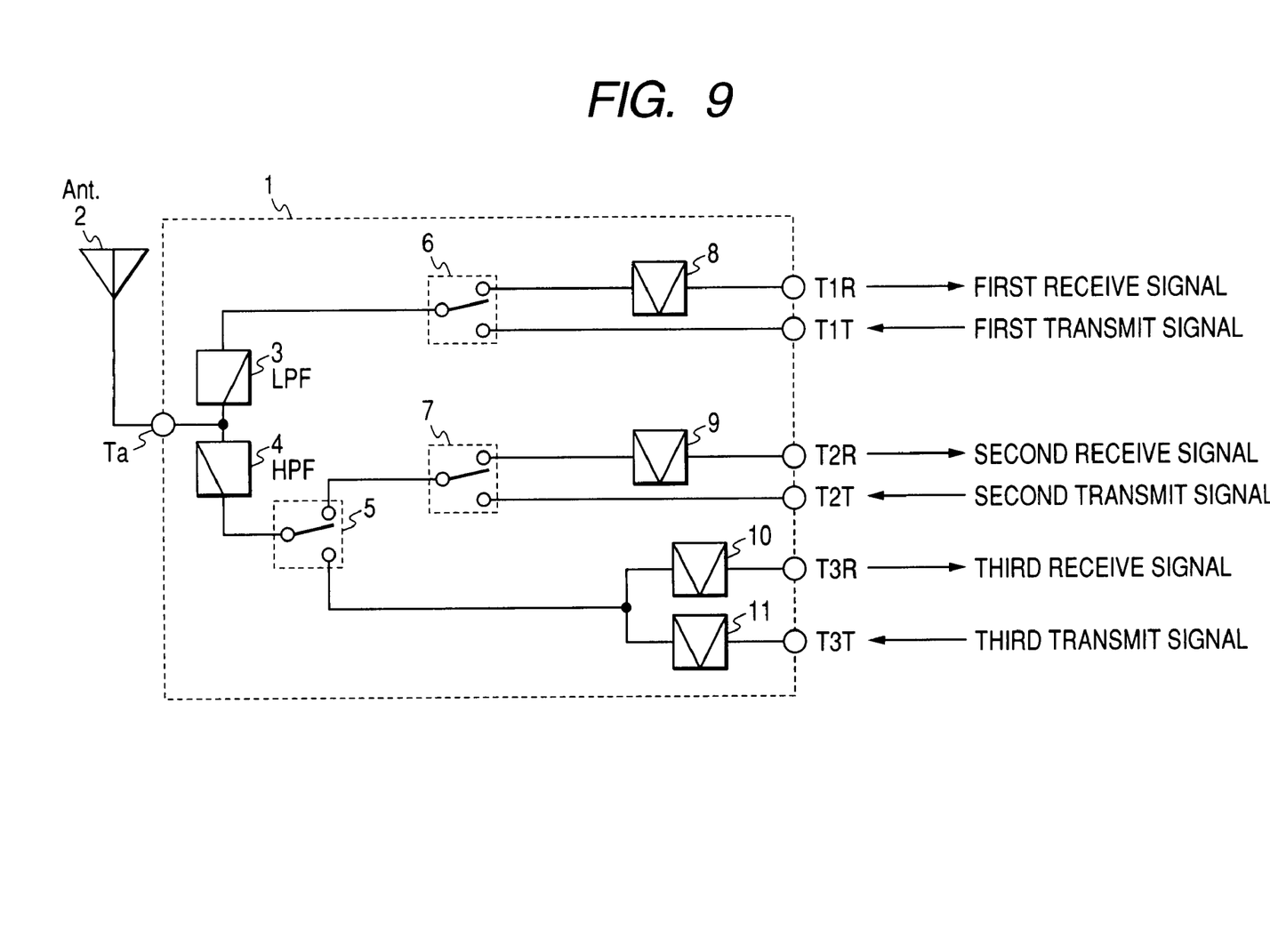
FIG. 9 is a block diagram showing an antenna sharing device according to a second embodiment of the present invention.

Next, a second embodiment of the present invention will be described with reference to FIG. 9. In the configuration shown in FIG. 9, a GSM receive filter 8, a DCS receive filter 9, and a WCDMA diplexer in which a CDMA receive filter 10 and a WCDMA transmit filter 11 are connected in parallel are disposed downstream of the switches.

These filters may comprise a combination of SAW (Surface Acoustic Wave), FBAR (Filmed Bulk Acoustic Resonator) and SMR (Solidly Mounted Resonator) filters.

The present embodiment, like the first embodiment, can provide an inexpensive and practical antenna sharing device which meets requirements in terms of transmitter distortion characteristic and ESD resistivity.

Embodiment 3

Next, a third embodiment of the present invention will be described. In introducing the first and second embodiments of the present invention, superiority of the present invention was described based on, for simplicity of explanation, a dual-mode, triple-band configuration for using GSM, DCS and WCDMA signals.

However, it is not only when a dual-mode, triple-band configuration is used that the superiority of the present invention is effective. The present invention is as effective as in the first and second embodiments also when a dual-mode, quintet band configuration is used.

Figure 10:
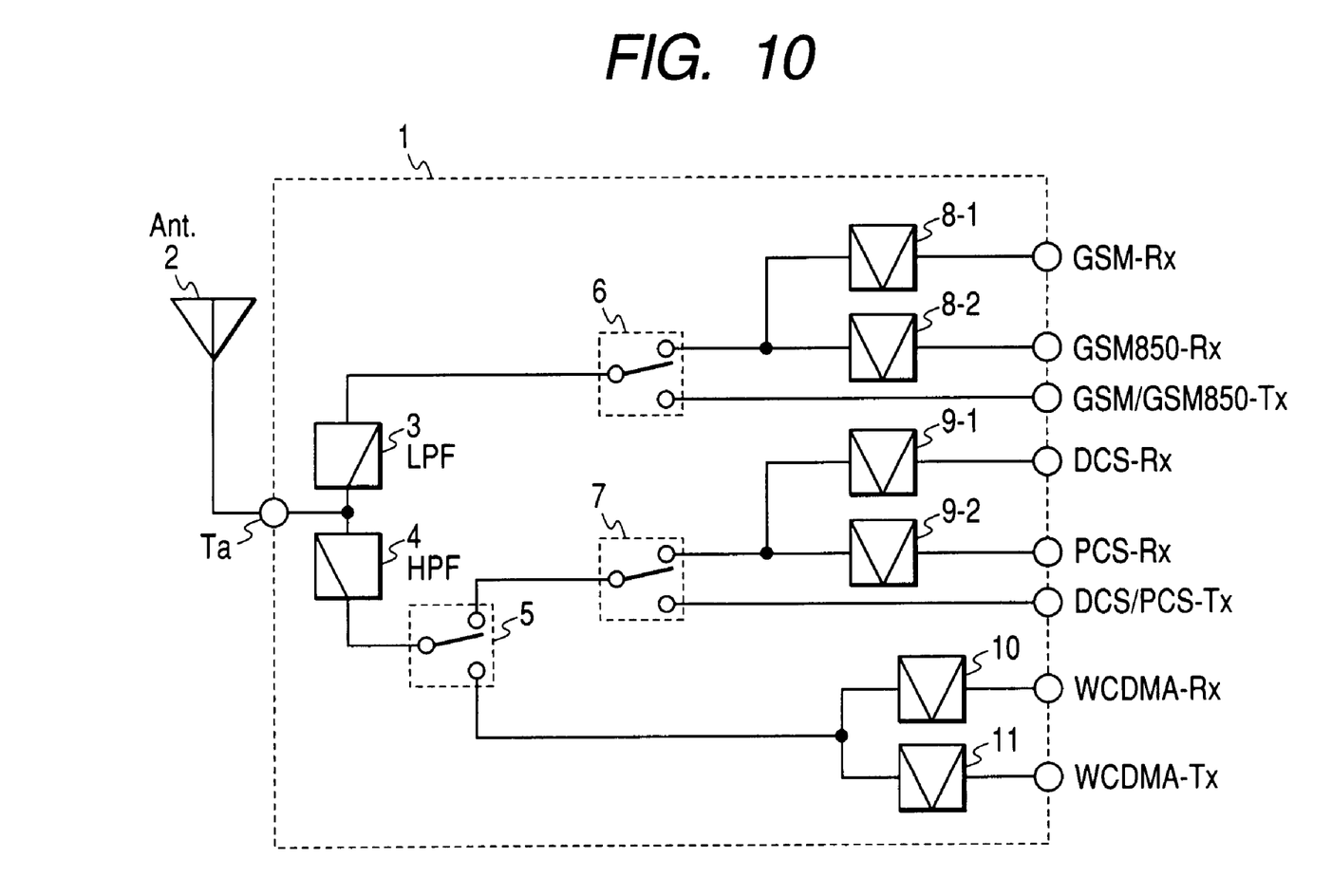
FIG. 10 is a block diagram showing an antenna sharing device according to a third embodiment of the present invention.

Namely, it is effective also when a dual-mode, quintet band configuration as shown in FIG. 10 is used with the configuration including a GSM filter circuit (8-1) and a GSM-850 filter circuit (8-2) connected in parallel downstream of a high-frequency switch 6, a DCS filter circuit (9-1) and a PCS filter circuit (9-2) connected in parallel downstream of a high-frequency switch 7, and a WCDMA filter circuit (10) connected downstream of a high-frequency switch 5.

The present embodiment, like the first and second embodiments, can provide an inexpensive and practical antenna sharing device which meets requirements in terms of transmitter distortion characteristic and ESD resistivity.

Embodiment 4

Figure 11:
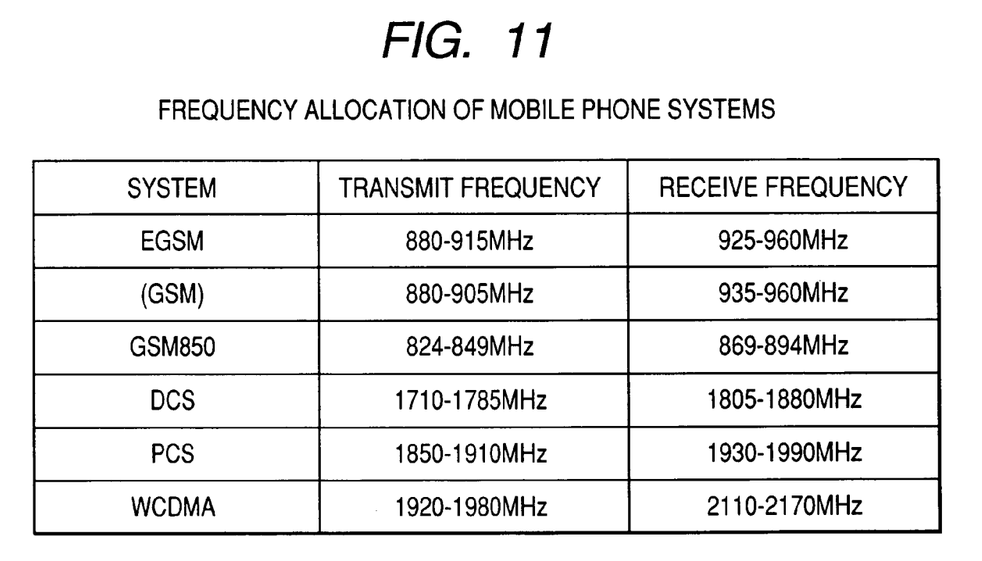
FIG. 11 is a diagram showing an example allocation of frequency bands used in a fourth embodiment of the present invention.

Next, a fourth embodiment of the present invention will be described. An antenna sharing device according to the present invention can be used for various types of wireless communication terminals which use frequency bands including those not described above. FIG. 11 shows an example allocation of frequency bands to which the antenna sharing device is applicable. The frequency bands that can be used in the present embodiment include EGSM, GSM, GSM 850, DCS, PCS, and WCDMA.

Figure 12:
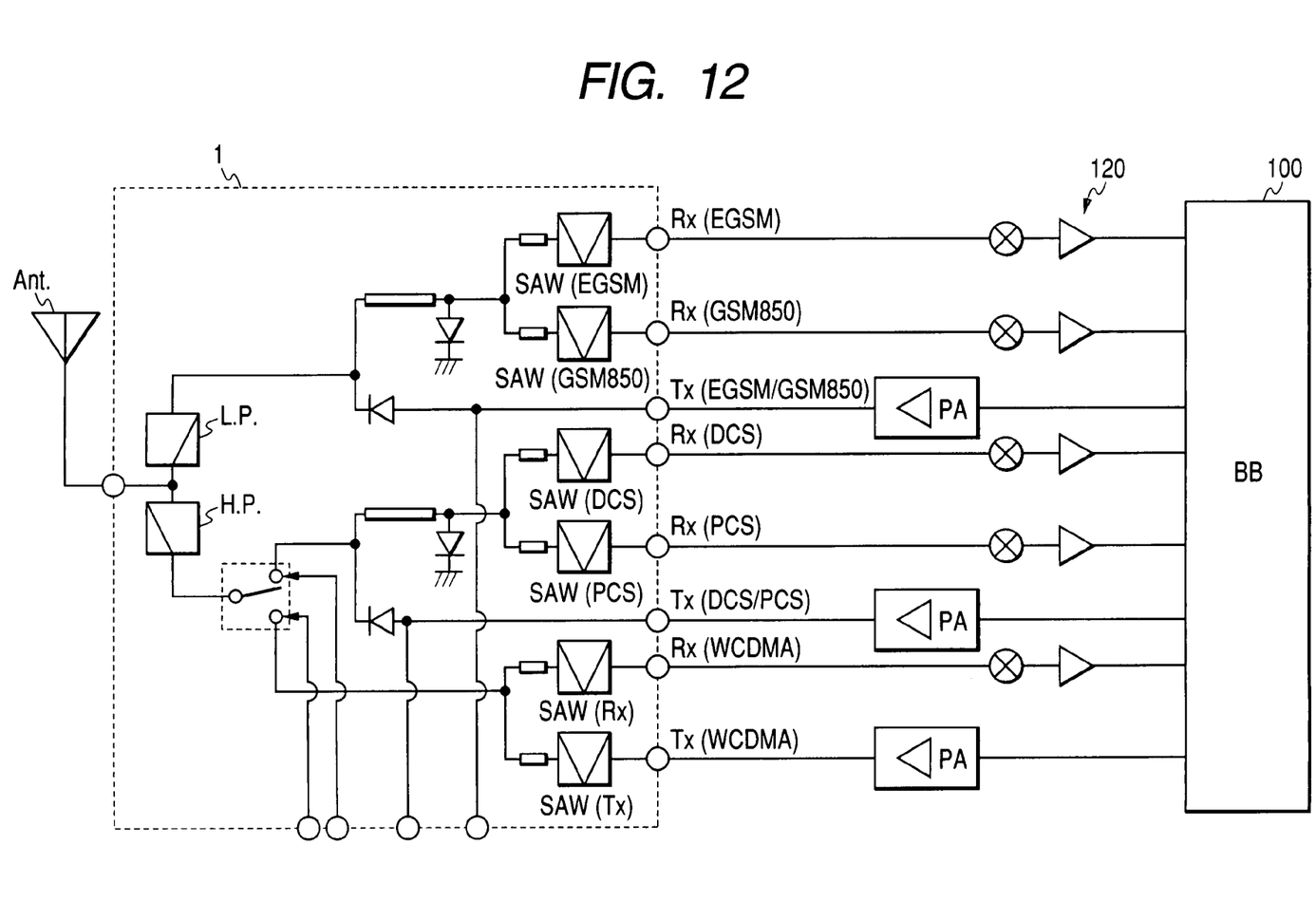
FIG. 12 is a block diagram of a quad-band wireless communication terminal using an antenna sharing device according to the fourth embodiment of the present invention.

FIG. 12 shows a block diagram of a quad-band wireless communication terminal to which one of the antenna sharing devices according to the foregoing embodiments is applied and which is compatible with the mobile communication frequencies listed in FIG. 11. The quad-band terminal shown in FIG. 12 includes an antenna sharing device 1, a base band/logic circuit 100, and an amplifier 120.

The antenna sharing device 1 has a diplexer including, for example, as shown in FIG. 1, the low-pass filter (LPF) 3 and the high-pass filter (LPF) 4 connected in parallel to the terminal Ta to which the antenna 2 is connected. The diplexer passes the EGSM and GSM signals inputted from the antenna 2 to the LPF side and the DCS, PCS, and WCDMA signals inputted from the antenna 2 to the HPF side. The baseband/logic circuit 100 and the amplifier 120 has a transmission unit capable of modulation and power amplification and a reception unit capable of low noise amplification and demodulation. The antenna sharing device 1 separates the transmission power over a very wide transmission band coming from the transmission unit and the reception power with a very narrow reception band coming from the antenna 2, and transmits the former to the antenna 2 and the latter to the reception unit.

In the case of an antenna sharing device for a quad-band terminal, transmit signals, EGSM and GSM 850, are close to each other in frequency, so that both of them are commonly amplified to about 2 W using a power amplifier operating in a 824 to 915 MHz band. Also, transmit signals, DCS and PCS, are close to each other in frequency, so that they are amplified to about 1 W using a power amplifier operating in a 1710 to 1910 MHz band. They are then fed to the corresponding transmit terminals of the antenna sharing device, respectively.

The antenna sharing device separates the receive signals according to their frequency bands. These signals are fed to low-noise amplifiers and converted into a baseband signal using a mixer. They are then demodulated into voice or data by going through signal processing circuits and baseband logic circuits.

The present embodiment can provide an inexpensive and practical antenna sharing device which meets requirements in terms of transmitter distortion characteristic and ESD resistivity.

What is claimed is:

1. An antenna sharing device which has a diplexer and which switches paths for signals in a plurality of frequency bands,
    wherein said diplexer comprising:
    at least a common signal terminal which is connected to an antenna and which transmits and receives signals in said plurality of frequency bands;
    a high-pass filter; and
    units for distributively outputting signals in each frequency band selected from said receive signals and for combining and outputting transmit signals to said signal terminal;
    wherein said antenna sharing device further comprising:
    a first high-frequency switch which is connected to said high-pass filter and which separates the transmit and receive signals in said plurality of frequency bands; and
    a second high-frequency switch which is connected to a first output terminal of said first high-frequency switch and which separates said transmit signal and the receive signal in a frequency band separated from said plurality of frequency bands;

wherein said first high-frequency switch includes compound semiconductors and said second high-frequency switch connected to said first output terminal includes PIN diodes.

2. The antenna sharing device according to claim 1, wherein said high-frequency switch comprising compound semiconductors has an input IP3 of 66 dBm or more.

3. The antenna sharing device according to claim 1, wherein an input-output characteristic of said high-pass filter is such that an attenuation in a frequency range of DC to 200 MHz is 30 dB or more.

4. An antenna sharing device which has a diplexer and which switches paths for signals in at least first, second and third frequency bands, wherein a maximum frequency of said first frequency band is lower than a minimum frequency of said second and third frequency bands;

wherein said diplexer comprising:

a first signal terminal which is a common signal terminal for transmitting and receiving signals in each of said frequency bands;

a second signal terminal which outputs signals in said first frequency band selected from the receive signals; and a third signal terminal which outputs signals in said second and third frequency bands, and units for distributing receive signals inputted to said first signal terminal to said second and third signal terminals and for combining transmit signals inputted to said second and third signal terminals and outputting the combined signal to said first signal terminal;

said antenna sharing device further comprising:

a first high-frequency switch which is connected to said third signal terminal of said diplexer and which separates said transmit and receive signals in said second frequency band and said transmit and receive signals in said third frequency band; and a second high-frequency switch which is connected to a first output terminal of said first high-frequency switch and which separates said transmit signal and said receive signal in said second frequency band; and wherein said first high-frequency switch includes compound semiconductors and said second high-frequency switch connected to said first output terminal includes PIN diodes.

5. The antenna sharing device according to claim 4, wherein said first high-frequency switch has an input IP3 which is at least as large as required to enable a receiver to obtain desired sensitivity even in a presence of an interfering wave anticipated to be generated with an inputting part of said first high-frequency switch being in a normal operating state.

6. The antenna sharing device according to claim 5, wherein said first high-frequency switch has an input IP3 of 66 dBm or more.

7. The antenna sharing device according to claim 6, wherein a second output terminal of said first high-frequency switch is connected to a terminal used to input and output WCDMA signals.

8. The antenna sharing device according to claim 4, wherein an input-output characteristic between said first signal terminal and said third signal terminal of said diplexer is such that an attenuation is as large as required to prevent said first high-frequency switch from being destroyed when a high inrush voltage anticipated to be generated in a normal operating state is applied to said first signal terminal.

9. The antenna sharing device according to claim 7, wherein an input-output characteristic between said first signal terminal and said third signal terminal of said diplexer is such that an attenuation in a frequency range of DC to 200 MHz is 30 dB or more.

10. The antenna sharing device according to claim 4, wherein said antenna sharing device further comprising:

a third high-frequency switch which, including PIN diodes, is connected to said second signal terminal of said diplexer and which separates said transmit signal and said receive signal in said first frequency band.

11. The antenna sharing device according to claim 4 further comprising:

a GSM receive filter connected to downstream of said third high-frequency switch;

a DCS receive filter and a PCS receive filter connected in parallel to downstream of said second high-frequency switch; and a WCDMA receive filter and a WCDMA transmit filter connected in parallel to downstream of said first high-frequency switch.

12. The antenna sharing device according to claim 11, wherein all components of said first to third high-frequency switches are integrated.

13. An antenna sharing device which has a diplexer and which switches paths for signals in at least first, second and third frequency bands, wherein a maximum frequency of said first frequency band is lower than a minimum frequency of said second and third frequency bands;

wherein said diplexer comprising:

a first signal terminal which is a common signal terminal connected to an antenna and used to transmit and receive signals in each of said frequency bands;

a low-pass filter which outputs signals in said first frequency band selected from said receive signals; and a high-pass filter which outputs signals in said second and third frequency bands selected from said receive signals;

said antenna sharing device further comprising:

a first high-frequency switch which is connected to said high-pass filter of said diplexer and which separates said transmit and receive signals in said second frequency band and said transmit and receive signals in said third frequency band; and a second high-frequency switch which is connected to a first output terminal of said first high-frequency switch and which separates said transmit signal and said receive signal in said second frequency band; and wherein said first high-frequency switch includes compound semiconductors and said second high-frequency switch connected to said first output terminal includes PIN diodes.

14. The antenna sharing device according to claim 13, wherein said first high-frequency switch including compound semiconductors has an input IP3 of 66 dBm or more.

15. The antenna sharing device according to claim 13, wherein an input-output characteristic of said high-pass filter is such that an attenuation is as large as required to prevent said first high-frequency switch from being destroyed when a high inrush voltage anticipated to be generated in a normal operating state is applied to said first signal terminal.

16. The antenna sharing device according to claim 13, wherein an input-output characteristic of said high-pass filter is such that an attenuation in a frequency range of DC to 200 MHz is 30 dB or more.

17. The antenna sharing device according to claim 16, wherein said high-pass filter includes a plurality of inductances and capacitances formed between layers of a ceramic substrate included in said antenna sharing device.

18. The antenna sharing device according to claim 13, wherein said antenna sharing device further comprising:
a third high-frequency switch which, including PIN diodes, is connected to said low-pass filter of said diplexer and which separates said transmit signal and said receive signal in said first frequency band.

19. The antenna sharing device according to claim 13, wherein all components of said first to third high-frequency switches are integrated.

* * * * *